US012230107B2

(12) United States Patent
Berman et al.

(10) Patent No.: US 12,230,107 B2
(45) **Date of Patent: *Feb. 18, 2025**

(54) GAMING SYSTEMS AND DEVICES TO CONFIGURE MULTIGAME BONUSES

(71) Applicant: KING SHOW GAMES, INC., Minnetonka, MN (US)

(72) Inventors: Bradley Berman, Minnetonka, MN (US); Jacob Lamb, Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,243

(22) Filed: Nov. 27, 2023

(65) Prior Publication Data

US 2024/0096178 A1 Mar. 21, 2024

Related U.S. Application Data

(63) Continuation of application No. 18/094,854, filed on Jan. 9, 2023, now Pat. No. 11,830,325, which is a continuation of application No. 17/571,747, filed on Jan. 10, 2022, now Pat. No. 11,551,528, which is a continuation of application No. 17/146,164, filed on Jan. 11, 2021, now Pat. No. 11,222,509, which is a continuation of application No. 15/807,354, filed on Nov. 8, 2017, now Pat. No. 10,896,577.

(60) Provisional application No. 62/419,429, filed on Nov. 8, 2016.

(51) Int. Cl.
*G07F 17/32* (2006.01)
*G07F 17/34* (2006.01)

(52) U.S. Cl.
CPC ...... *G07F 17/3267* (2013.01); *G07F 17/3209* (2013.01); *G07F 17/3213* (2013.01); *G07F 17/3225* (2013.01); *G07F 17/3258* (2013.01); *G07F 17/34* (2013.01)

(58) Field of Classification Search
CPC ...................................................... G06F 17/34
See application file for complete search history.

(56) References Cited

U.S. PATENT DOCUMENTS 6,217,448 B1 4/2001 Olsen
6,575,832 B1 6/2003 Manfredi et al.
7,914,377 B2 * 3/2011 Benbrahim ............. G07F 17/34 463/25
8,157,644 B2 4/2012 Boyd et al.
(Continued)

*Primary Examiner* — Milap Shah

(57) ABSTRACT

Embodiments of the present invention set forth systems, apparatuses and methods for facilitating the configuration of multigame bonuses on independent gaming devices. Accordingly, a gaming device including a display, input device, memory, and processor can be configured to be part of a multigame bonus while not requiring a direct connection to a multigame bonus controller, or to other gaming devices involved in the multigame bonus. This may be accomplished by configuring the gaming device to provide a mechanism for an operator to set up bonus parameters with a specified side wager or bet to be eligible for a particular jackpot prize. Since each gaming device can be independently set up to be part of the multigame bonus, unrelated gaming devices running different primary gaming events with different wager or game characteristics can be part of the same multigame bonus without affecting game play of the primary gaming events.

10 Claims, 12 Drawing Sheets

(56) References Cited

U.S. PATENT DOCUMENTS

| | | | | |
|---|---|---|---|---|
| 8,517,826 | B1 * | 8/2013 | Hafezi | G07F 17/3262 463/16 |
| 8,550,910 | B2 * | 10/2013 | Ward | G07F 17/3244 463/31 |
| 10,896,577 | B2 | 1/2021 | Berman et al. | |
| 11,222,509 | B2 | 1/2022 | Berman et al. | |
| 11,551,528 | B2 | 1/2023 | Berman et al. | |
| 11,830,325 | B2 * | 11/2023 | Berman | G07F 17/3213 |
| 2002/0142825 | A1 | 10/2002 | Lark et al. | |
| 2002/0142846 | A1 | 10/2002 | Paulsen | |
| 2003/0100360 | A1 | 5/2003 | Manfredi et al. | |
| 2003/0176219 | A1 | 9/2003 | Manfredi et al. | |
| 2003/0216182 | A1 | 11/2003 | Gauselmann | |
| 2004/0092315 | A1 | 5/2004 | Boyd et al. | |
| 2006/0111178 | A1 | 5/2006 | Gallaway et al. | |
| 2007/0213121 | A1 | 9/2007 | Moshal et al. | |
| 2008/0064501 | A1 | 3/2008 | Patel | |
| 2008/0113811 | A1 | 5/2008 | Linard et al. | |
| 2008/0249860 | A1 | 10/2008 | Carotta et al. | |
| 2009/0143136 | A1 | 6/2009 | Thomas | |
| 2010/0120490 | A1 | 5/2010 | Mclaughlin et al. | |
| 2011/0014971 | A1 * | 1/2011 | Ward | G07F 17/323 463/43 |
| 2013/0344945 | A1 * | 12/2013 | Hafezi | G07F 17/3262 463/25 |
| 2014/0051500 | A1 | 2/2014 | Anderson et al. | |
| 2014/0206432 | A1 | 7/2014 | Radek et al. | |
| 2014/0315619 | A1 | 10/2014 | Bowers et al. | |
| 2014/0335943 | A1 | 11/2014 | Vann | |
| 2018/0033237 | A1 | 2/2018 | Osmond et al. | |

* cited by examiner

510

| | | | | |
|---|---|---|---|---|
| JACKPOT VALUE | $20,000 | | | |
| SIDE BET RETURN | 0.899 | | | |
| SPINS/DAY | 1800 | | | |
| SIDE BET | 20 | | | |
| | | | | |
| **WHEEL** | | | **RETURN FROM CREDITS** | **RETURN FROM JACKPOT** |
| Value | Weight | | 0.854160417 | 0.044839583 |
| 100 | 0.08 | | | |
| 150 | 0.1 | | | |
| 200 | 0.1 | | | |
| 300 | 0.1 | | | |
| 400 | 0.1 | | | |
| 500 | 0.1 | | | |
| 1000 | 0.1 | | | |
| 1500 | 0.07997 | | | |
| 2000 | 0.08 | | | |
| 2500 | 0.08 | | | |
| 5000 | 0.08 | | | |
| JACKPOT | 0.00003 | | | |
| | | | | |
| **BANK** | | | | |
| SIDE BET | #MACHINES | WHEEL FREQ PER MACHINE | JACKPOT FREQ PER MACHINE | BANK HITS EVERY X DAYS |
| 5 | 10 | 267.6206897 | 8920689.655 | 495.5938697 |
| 10 | 10 | 133.8103448 | 4460344.828 | 247.7969349 |
| 15 | 10 | 89.20689655 | 2973563.218 | 165.1979566 |
| 20 | 10 | 66.90517241 | 2230172.414 | 123.8984674 |
| 25 | 10 | 53.52413793 | 1784137.931 | 99.11877395 |
| 30 | 10 | 44.60344828 | 1486781.609 | 82.59897829 |
| 40 | 10 | 33.45258621 | 1115086.207 | 61.94923372 |
| 50 | 10 | 26.76206897 | 892068.9655 | 49.55938697 |

530

520

500

FIG. 5

610

| | | | | |
|---|---|---|---|---|
| JACKPOT VALUE | $50,000 | | | |
| SIDE BET RETURN | 0.92 | | | |
| SPINS/DAY | 1800 | | | |
| SIDE BET | 25 | | | |
| | | | | |
| **WHEEL** | | | **RETURN FROM CREDITS** | **RETURN FROM JACKPOT** |
| Value | Weight | | 0.813267747 | 0.106732253 |
| 100 | 0.08 | | | |
| 150 | 0.1 | | | |
| 200 | 0.1 | | | |
| 300 | 0.1 | | | |
| 400 | 0.1 | | | |
| 500 | 0.1 | | | |
| 1000 | 0.1 | | | |
| 1500 | 0.07997 | | | |
| 2000 | 0.08 | | | |
| 2500 | 0.08 | | | |
| 5000 | 0.08 | | | |
| JACKPOT | 0.00003 | | | |
| | | | | |
| **BANK** | | | | |
| SIDE BET | #MACHINES | WHEEL FREQ PER MACHINE | JACKPOT FREQ PER MACHINE | BANK HITS EVERY X DAYS |
| 5 | 10 | 281.0771739 | 9369239.13 | 520.513285 |
| 10 | 10 | 140.538587 | 4684619.565 | 260.2566425 |
| 15 | 10 | 93.6923913 | 3123079.71 | 173.5044283 |
| 20 | 10 | 70.26929348 | 2342309.783 | 130.1283213 |
| 25 | 10 | 56.21543478 | 1873847.826 | 104.102657 |
| 30 | 10 | 46.84619565 | 1561539.855 | 86.75221417 |
| 40 | 10 | 35.13464674 | 1171154.891 | 65.06416063 |
| 50 | 10 | 28.10771739 | 936923.913 | 52.0513285 |

630

620

600

FIG. 6

710

| | | | | |
|---|---|---|---|---|
| JACKPOT VALUE | $125,000 | | | |
| SIDE BET RETURN | 0.95 | | | |
| SPINS/DAY | 1800 | | | |
| SIDE BET | 30 | | | |
| | | | | |
| **WHEEL** | | | **RETURN FROM CREDITS** | **RETURN FROM JACKPOT** |
| Value | Weight | | 0.715309248 | 0.234690752 |
| 100 | 0.08 | | | |
| 150 | 0.1 | | | |
| 200 | 0.1 | | | |
| 300 | 0.1 | | | |
| 400 | 0.1 | | | |
| 500 | 0.1 | | | |
| 1000 | 0.1 | | | |
| 1500 | 0.07997 | | | |
| 2000 | 0.08 | | | |
| 2500 | 0.08 | | | |
| 5000 | 0.08 | | | |
| JACKPOT | 0.00003 | | | |
| | | | | |
| **BANK** | | | | |
| SIDE BET | #MACHINES | WHEEL FREQ PER MACHINE | JACKPOT FREQ PER MACHINE | BANK HITS EVERY X DAYS |
| 5 | 20 | 319.5694737 | 10652315.79 | 295.8976608 |
| 10 | 20 | 159.7847368 | 5326157.895 | 147.9488304 |
| 15 | 20 | 106.5231579 | 3550771.93 | 98.63255361 |
| 20 | 20 | 79.89236842 | 2663078.947 | 73.9744152 |
| 25 | 20 | 63.91389474 | 2130463.158 | 59.17953216 |
| 30 | 20 | 53.26157895 | 1775385.965 | 49.3162768 |
| 40 | 20 | 39.94618421 | 1331539.474 | 36.9872076 |
| 50 | 20 | 31.95694737 | 1065231.579 | 29.58976608 |

730

720

700

FIG. 7A

710

| | | | | |
|---|---|---|---|---|
| JACKPOT VALUE | $125,000 | | | |
| SIDE BET RETURN | 0.95 | | | |
| SPINS/DAY | 1800 | | | |
| SIDE BET | 30 | | | |
| | | | | |
| **WHEEL** | | | **RETURN FROM CREDITS** | **RETURN FROM JACKPOT** |
| Value | Weight | | 0.816119495 | 0.133880505 |
| 100 | 0.08 | | | |
| 150 | 0.1 | | | |
| 200 | 0.1 | | | |
| 300 | 0.1 | | | |
| 400 | 0.1 | | | |
| 500 | 0.1 | | | |
| 1000 | 0.1 | | | |
| 1500 | 0.079985 | | | |
| 2000 | 0.08 | | | |
| 2500 | 0.08 | | | |
| 5000 | 0.08 | | | |
| JACKPOT | 0.000015 | | | |
| | | | | |
| **BANK** | | | | |
| SIDE BET | #MACHINES | WHEEL FREQ PER MACHINE | JACKPOT FREQ PER MACHINE | BANK HITS EVERY X DAYS |
| 5 | 20 | 280.1005263 | 18673368.42 | 518.7046784 |
| 10 | 20 | 140.0502632 | 9336684.211 | 259.3523392 |
| 15 | 20 | 93.36684211 | 6224456.14 | 172.9015595 |
| 20 | 20 | 70.02513158 | 4668342.105 | 129.6761696 |
| 25 | 20 | 56.02010526 | 3734673.684 | 103.7409357 |
| 30 | 20 | 46.68342105 | 3112228.07 | 86.45077973 |
| 40 | 20 | 35.01256579 | 2334171.053 | 64.8380848 |
| 50 | 20 | 28.01005263 | 1867336.842 | 51.87046784 |

730

720

700

FIG. 7B

| | | | | | | | |
|---|---|---|---|---|---|---|---|
| JACKPOT VALUE | $30,000.00 | | SIDE BET RETURN | 0.899 | | SPINS/DAY | 1800 |
| | | | | | | | |
| | | | | | | | |
| SIDE BET | #MACHINES | WHEEL FREQ. | JACKPOT FREQ | BANK HITS EVERY X DAYS | | | |
| 5 | 10 | 274.294772 | 9143159.066 | 507.9532814 | | | |
| 10 | 10 | 137.147386 | 4571579.533 | 253.9766407 | | | |
| 15 | 10 | 91.43159066 | 3047719.689 | 169.3177605 | | | |
| 20 | 10 | 68.57369299 | 2285789.766 | 126.9883204 | | | |
| 25 | 10 | 54.85895439 | 1828631.813 | 101.5906563 | | | |
| 30 | 10 | 45.71579533 | 1523859.844 | 84.65888024 | | | |
| 40 | 10 | 34.2868465 | 1142894.883 | 63.49416018 | | | |
| 50 | 10 | 27.4294772 | 914315.9066 | 50.79532814 | | | |
| | | | | | | | |
| | | | | | | | |
| | | | | | | | |
| WHEEL | | | | | | | |
| | | | | | | | |
| Value | Weight | Contribution | | | | | |
| 100 | 0.08 | 8 | | | | | |
| 150 | 0.1 | 15 | | | | | |
| 200 | 0.1 | 20 | | | | | |
| 300 | 0.1 | 30 | | | | | |
| 400 | 0.1 | 40 | | | | | |
| 500 | 0.1 | 50 | | | | | |
| 1000 | 0.1 | 100 | | | | | |
| 1500 | 0.07997 | 119.955 | | | | | |
| 2000 | 0.08 | 160 | | | | | |
| 2500 | 0.08 | 200 | | | | | |
| 5000 | 0.08 | 400 | | | | | |
| JACKPOT | 0.00003 | 90 | | | | | |
| | | | | | | | |
| | 1 | 1232.955 | | | | | |

800

FIG. 8

GAMING SYSTEMS AND DEVICES TO CONFIGURE MULTIGAME BONUSES

RELATED APPLICATIONS

This application is a continuation of U.S. application Ser. No. 18/094,854, filed Jan. 9, 2023, now U.S. Pat. No. 11,830,325, which is a continuation of U.S. application Ser. No. 17/571,747, filed Jan. 10, 2022, now U.S. Pat. No. 11,551,528, which is a continuation of U.S. application Ser. No. 17/146,164, filed Jan. 11, 2021, now U.S. Pat. No. 11,222,509, which is a continuation of U.S. application Ser. No. 15/807,354, filed Nov. 8, 2017, now U.S. Pat. No. 10,896,577, which claims the benefit of Provisional Patent Application No. 62/419,429, filed on Nov. 8, 2016, to which priority is claimed pursuant to 35 U.S.C. § 119(e) and which is incorporated herein by reference in its entirety.

FIELD OF THE INVENTION

This disclosure relates generally to games, and more particularly to systems, apparatuses and methods for configuring multigame bonuses on gaming devices.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate configuring multigame bonuses on gaming devices. In some embodiments, a gaming device including a display, input device, memory, and processor can be configured to be part of a multigame bonus while not requiring a direct connection to a multigame bonus controller, or to other gaming devices involved in the multigame bonus. This may be accomplished in these embodiments by configuring the gaming device to provide a mechanism for an operator to set up bonus parameters with, for example, but not necessarily needed, a specified side wager or bet to be eligible for a particular jackpot prize. That is, aspects of these embodiments specify that the gaming devices include a bonus module stored in the memory including fixed parameters and variable parameters of a multigame bonus. The processor in the gaming device may be operable to display a menu upon request of an operator, where the menu includes selection fields capable of being adjusted by the operator, and resulting values that are updated when the selection fields are updated by an operator to display the effects of the changes made by the operator. To this end, the operator may set otherwise unrelated gaming devices to be part of a multigame bonus without directly linking the gaming devices, or having to utilize a central controller to run the bonus.

According to some embodiments, a gaming device includes a display, an input device, a memory, and a processor. The memory may be configured to store instructions associated with a game module to operate a primary game on the gaming device, and to store instructions associated with a bonus module to operate a jackpot bonus feature on the gaming device. The processor may be operable to receive instructions to allow secure access to the bonus module, and present a menu interface from the bonus module on the display, where the menu interface includes at least one variable entry field and at least one outcome statistic based on the at least one variable entry field. The processor may be further operable to receive a signal from the input device to adjust the at least one variable entry field, perform at least one calculation associated with the outcome statistic based on the adjustment to the at least one variable entry field, and update the outcome statistic on the display based on the calculation.

BRIEF DESCRIPTION OF THE DRAWINGS

FIG. 5 is diagram of an example operator configuration menu for a multigame bonus according to embodiments of the invention.

FIG. 6 is diagram of an example operator configuration menu for a multigame bonus according to embodiments of the invention.

FIG. 7A is diagram of an example operator configuration menu for a multigame bonus according to embodiments of the invention.

FIG. 7B is diagram of an example operator configuration menu for a multigame bonus according to embodiments of the invention.

FIG. 8 is diagram of an example operator configuration menu for a multigame bonus according to embodiments of the invention.

DETAILED DESCRIPTION

Figure 1:
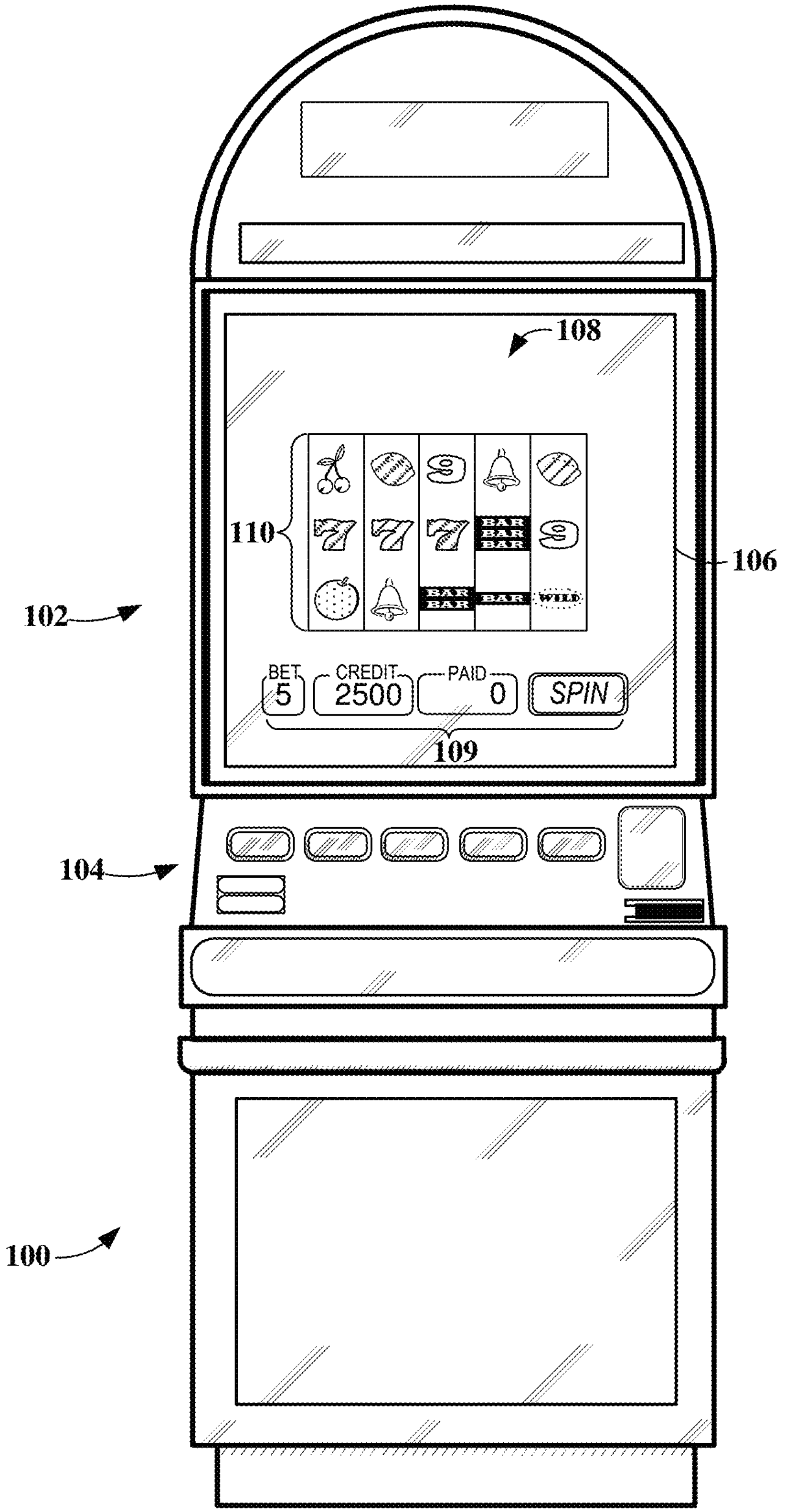
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms “reels,” “cards,” “decks,” and similar mechanically descriptive language may be used to describe various apparatus presentation features, as well as various actions occurring to those objects (e.g., “spin,” “draw,” “hold,” “bet”). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatus.

In various embodiments of the invention, the gaming displays are described in conjunction with the use of data in the form of “symbols.” In the context of this disclosure, a “symbol” may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for configuring multigame bonuses on gaming devices. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multiplayer games, etc. Further, the disclosure may be applied to games of chance, and descriptions provided in the context of any representative game (e.g. slot game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations of configuring multigame bonuses on gaming devices. In one embodiment, a method of operating a gaming device includes creating a banked jackpot award controller implemented via a drop-in wheel based bonus presentation.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as “displays” or “gaming displays”) that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touchscreen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some the example embodiments illustrated herein, the primary gaming portion 108 may display a grid (or equivalent arrangement) of game elements 110 or game element positions (also referred to as "reel stop positions" herein). As illustrated in the embodiment shown in FIG. 1, the grid includes three rows and five columns of game elements 110, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as paytables, navigation controls, etc.

Figure 2:
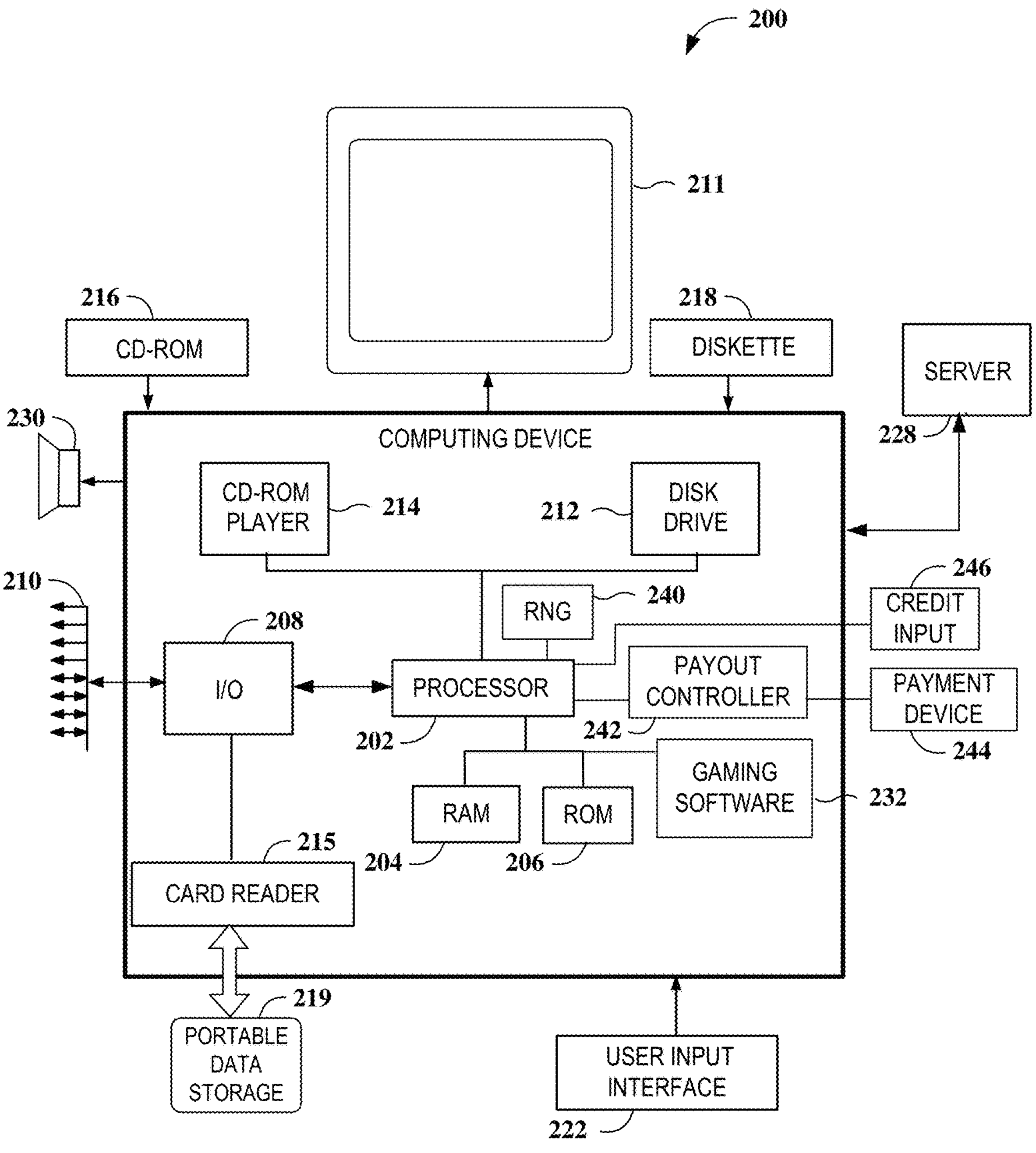
FIG. 2 is a block diagram illustrating a computing arrangement according to embodiments of the invention.

Although FIG. 1 illustrates a particular implementation of some of the embodiments of this invention in a casino or electronic gaming machine ("EGM"), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 2.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 200 of FIG. 2 is an example computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions in accordance with the present invention typically includes a central processor (CPU) 202 coupled to random access memory (RAM) 204 and some variation of read-only memory (ROM) 206. The ROM 206 may also represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to the display 211, which represents a display on which the gaming activities in accordance with the invention are presented. The display 211 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, or inputting data to identify a player for a player loyalty system. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. The present invention is operable using any known RNG, and may be integrally programmed as part of the processor 202 operation, or alternatively may be a separate RNG controller 240. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout device 244 may also be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 may also include accounting data stored in one of network the memory devices 204, 206. This accounting data may be transmitted to a casino accounting or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described hereinabove. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 232 may include instructions to provide other functionality as known in the art or as described and shown herein.

As discussed above, embodiments of the present concept include providing gaming devices, gaming systems, and methods of operating these devices or systems to provide game play that utilizes operations of configuring multigame bonuses on gaming devices. In one embodiment, a method of operating a gaming device includes creating a way to control participation in a banked jackpot award implemented via a drop-in bonus presentation, such as a wheel-based bonus feature. Some embodiments of this invention can be applied to any slot machine, regardless of bet size or any other characteristics. These embodiments may be targeted towards a banked set of un-linked machines, where it provides a mechanism for an operator to quickly and simply configure each machine in the bank to leverage a common jackpot award. The need to not have the machines be linked, or otherwise in communication with each other or a controller, allows great flexibility in setting up bonuses that multiple games can participate in. The banked bonus may be implemented using various bonus or prize-awarding mechanics, including progressive award pays, mystery bonuses, bonus wheels, pick bonuses, free spins bonuses, quest bonuses, skill-based bonuses, or any other type of related mechanic. In some embodiments, the gaming devices need not be in communication with a progressive meter, and need not have a contribution funding the progressive. Rather, in these embodiments, the bonus and/or progressive can be set up account for this lack of communication by using the progressive reset value, average hit value of the progressive, or other metrics. In other embodiments, the gaming devices may still be in communication with a progressive controller to provide a contribution to the progressive award even if the game do not need to be directly linked to one another for communication purposes. For ease of reference, a wheel bonus will be mostly discussed herein as a bonus mechanic for use with the drop-in bonus module that enables multiple different types of gaming devices to participate in multi-game jackpot award.

In some embodiments, the banked wheel will be a module consisting of a wheel bonus and an operator controller. The wheel bonus can be added to any slot game, and may be funded entirely by a bonus bet that the operator configures independently of any underlying game. In other embodiments, however, a bonus bet may not be required to use the bonus module. Alternatively, for example, a lower paytable could be implemented in the game for use when the bonus module is activated in the game machine. In embodiments using a bonus wheel, the wheel may consist of 12 wedges, where 11 of the wedges will be standard credit values implemented into the wheel math. The 12th wedge may be a dynamic value that the operator can configure. Examples of this value would be a car, a vacation, a large cash prize, etc. As mentioned above, although a wheel is used in the above example embodiment, other types of bonus mechanics may be used in other embodiments. Additionally, bonus wheels with different numbers of wedges or sections may be used, and more than one wedge of the bonus wheel may be configurable by an operator.

In some of these embodiments, since the wheel is a drop-in feature for any slot game, its return and funding may be entirely self-contained. The operator may use a proprietary menu system to configure the wheel to accommodate the desired jackpot value, wheel return, and side bet to activate the wheel. The menu may also allow the operator to enter information about the number of machines banked and the average spins per day to get projections on jackpot frequency for the bank.

The operator menu may be integrated into the standard EGM operator configuration menu set, allowing for simple wheel bank setup. The operator menu may also provide stats as to the wheel's performance, such as hit rate, wedge award counts, etc.

The wheel bank may be compelling because it allows the operator to set up a bank of machines to leverage a single large jackpot value without need of any external controller. Each banked machine operates independently of the others, but all will see the benefits of a commonly shared jackpot value. The operator will only have to set some key parameters for each game they want to utilize the wheel. The menu system will make this setup clear, easy and verifiable.

Figure 3:
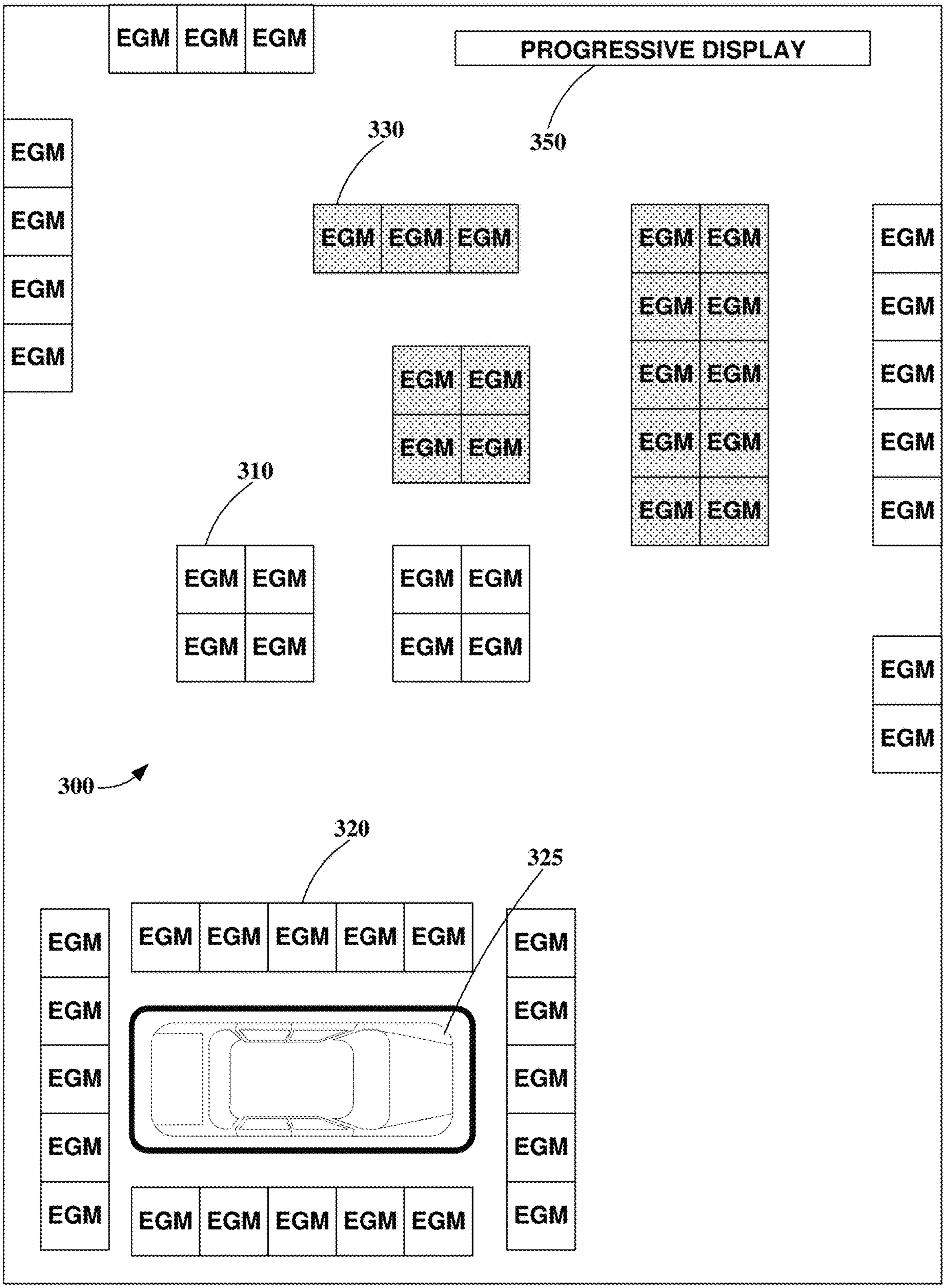
FIG. 3 is a block diagram illustrating an example game floor in a gaming establishment according to embodiments of the invention.

FIG. 3 is a block diagram illustrating an example game floor 300 in a gaming establishment according to embodiments of the invention. Referring to FIG. 3, the gaming floor 300 may include multiple banks of gaming devices 310 (also called Electronic Gaming Machines or EGMs). The gaming floor 300 may also include one or more large value prizes, such as a car 325 on a pedestal, or a large progressive 350 that may be linked to wide-area progressive across multiple casinos, or be a locally-based progressive. Operators often want to provide attractive large value prizes to players to increase play and interest in the gaming establishment. These promotional-type contests often do not have fixed value prizes. Hence, gaming devices cannot usually be pre-programmed to account for these jackpot award items. Typically, operators have had to rely on a bonus controller that is bank-based or area-based to control the play of the machines associated with the jackpot award. However, this can limit the type of machines used with the jackpot award, as similar gaming devices are typically required to have a consistent contribution of a wager be used toward the value of the jackpot award. Additionally, jackpot, bank, or bonus controllers add extra device costs and complications.

Embodiments of the concept discussed herein provide gaming devices and gaming systems to address these issues. For example, the gaming devices 320 surrounding the jackpot car 325 award may all be configured to participate in attempting to win the car. Additionally, selected gaming devices 330 may be configured to participate in trying to win a local area progressive award displayed on progressive display 350. Which gaming devices 310 are to be selected 330 to participate in the progressive award can be easily set and/or changed by the operator to improve flexibility, all without needing the gaming devices to be running substantially similar games.

Figure 4:
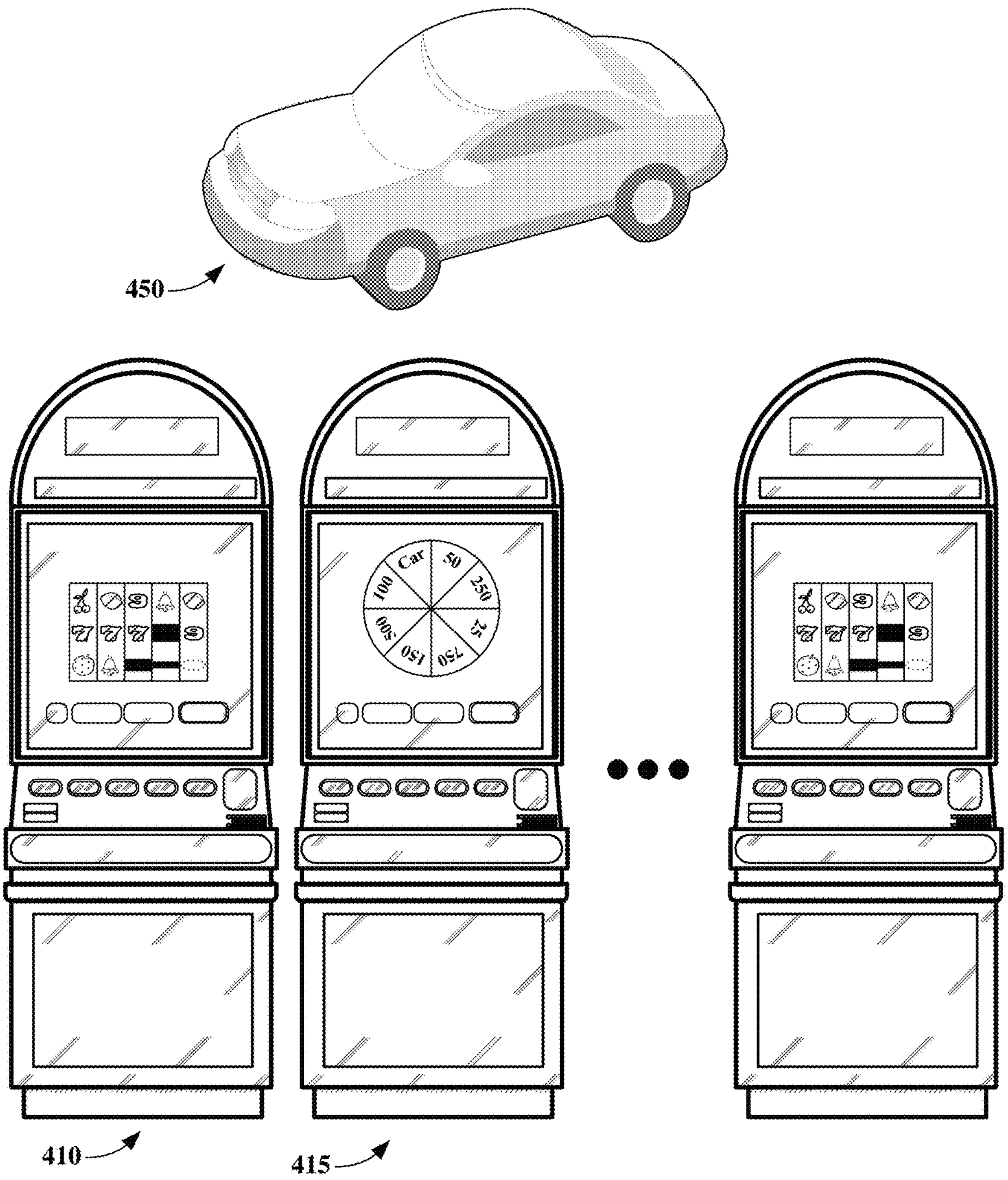
FIG. 4 is a diagram of a bank of gaming machines according to embodiments of the invention.

FIG. 4 is a diagram of a bank of gaming machines according to embodiments of the invention. Here, gaming devices 410 in a bank or group of gaming devices may be able to participate in trying to win a jackpot prize, such as a car 450. In some embodiments, this may include providing a drop-in bonus module that gives player's a chance to win the jackpot prize 450. By using a bonus mechanic, a player can hit the bonus mechanic more often and feel like they have a chance to win the jackpot award 450 instead of a single symbol combination that very rarely is even partially on the game display. In FIG. 4, a second gaming device 415 in the bank has triggered the bonus wheel, and now has a chance of winning the jackpot prize 450.

The prize wheel bonus module may be applied to any slot game, regardless of bet size or any other characteristics. It may be targeted towards a single machine or a banked (or other) set of machines, where it provides a mechanism for an operator to quickly and simply configure each machine in the bank to leverage a common jackpot award. The prize wheel bonus module can be an add-on module consisting of a wheel bonus and an operator controller. The prize wheel bonus module may be added to any slot game, or any bank of related or unrelated slot games, and may be funded entirely by a bonus bet that the operator configures independently of any underlying game. The size of the bonus bet may be an option the operator can set. There are many ways to set up the prize wheel bonus module. For example, the number of wedges, the prize values, the prize weights, etc. can all be varied.

In some embodiments, the prize wheel bonus module could include a bonus wheel with 12 sections or wedges. In some embodiments, 11 of the wedges may be credit values fixed into the wheel math. On the other hand, the 12th wedge may be a dynamic value that the operator can configure. In other embodiments, more than one wedge may be devoted to jackpot values, or may be configurable within a particular range by the operator. Examples of these jackpot awards may be a car, motorcycle, truck, a vacation, a large cash prize, progressive, multi-level progressive, etc.

As discussed above, the prize wheel bonus module may be a drop-in feature for any slot game. That is, the return and funding for the bonus module may be entirely self-contained. For this reason, the feature can be applied to a bank (or other grouping) of entirely unrelated slot games, linked or unlinked. There are no restrictions relative to bank cost to cover or any other math characteristics. In some embodiments, the bonus module may come with a standard, common art package that can be easily enabled/disabled/configured by the operator.

The operator may use a proprietary menu system to configure the wheel to accommodate the desired jackpot value, wheel return, and side bet to activate the prize wheel bonus module. The menu will also allow the operator to enter information about the number of machines banked, if applicable, and the projected average spins per day to get expected jackpot frequencies for the machine and/or bank. The operator menu may be integrated into the standard EGM operator configuration menu set, allowing for simple setup of the prize wheel bonus module. The operator menu may also provide stats related to wheel performance, such as hit rate, wedge award weights, etc.

The prize wheel bonus module may be compelling because it allows the operator to set up a machine or bank of machines to leverage a single large jackpot value or set of jackpot values without need of any external controller. Each machine configured to use the prize wheel bonus module operates independently of the others, but in a banked setting all will see the benefits of a commonly shared jackpot value. The operator may only have to set some key parameters for each game they want to utilize the prize wheel bonus module. The menu system may make this setup clear, easy, and verifiable.

Examples of configuration details are discussed below in conjunction with example configuration menus shown in FIGS. 5, 6, 7A, 7B, and 8. Operator configurable fields are highlighted. The Wheel and Bank tables show the operator information about the values and weights of the wheel, and some hit frequency statistics of the prize wheel bonus module given a standard set of optional side bets and bank sizes. Note that the operator can also configure the number of Machines, which is shown shaded, but this has no bearing on the per-machine prize wheel bonus module jackpot frequency. It only serves as a guide to the operator to understand how the prize wheel bonus module will behave if it is banked.

In the first example shown in FIG. 5, suppose an operator is configuring the bank to a common jackpot of a motorcycle with a value of $20,000. The operator can use a configuration menu 500 having a multiple input fields 510 and output fields 530 that are calculated based on the values used in the input fields. The configuration menu 500 may also include optional input values 520 to provide further information to the operator. Here, the operator can set the side bet return to a percentage greater than or equal to that of the base game overall return, in this case 89.9%. The wheel wedge values and weights are shown as is the return contributions of the credit wheel wedges and the jackpot wedges. As shown, the credit wedges comprise the large majority of the prize wheel bonus module return. The Bank section shows some statistics on bank behavior given common bank size and side bet options. Statistics shown include the Prize Wheel frequency for a single machine, the jackpot frequency for a single machine, and the expected number of days between jackpot hits for the entire bank.

Using this information, the following can be seen. Suppose the operator configures a bank of machines with the following characteristics:

Jackpot: Motorcycle—value $20,000
Machines In Bank—10
Estimate Spins Per Day—1800
Side Bet—20 coins
Side Bet Return—89.9%

It will then be known that the prize wheel bonus module will come up for an individual player 1 in every 66.9 spins. The return from the prize wheel bonus module will be 85.42% from credit wedges and 4.48% from the Jackpot. The Jackpot will hit 1 in every 2,230,172 spins per machine, or once every 123.9 days for the bank.

FIG. 6 illustrates another example of the configuration menu 600. The operator can again use the configuration menu 600 having a multiple input fields 610 and output fields 630 that are calculated based on the values used in the input fields to set up the Prize Wheel bonus. The configuration menu 600 may also include optional input values 620 to provide further information to the operator. Here, the operator has configured a bank of machines with the following characteristics:

Jackpot: Pickup Truck—value $50,000
Machines In Bank—10
Estimate Spins Per Day—1800
Side Bet—25 coins
Side Bet Return—92.0%

Based on the above inputs, we know that the Prize Wheel will come up for an individual player 1 in every 56.2 spins. The return from the Prize Wheel will be 81.33% from credit wedges and 10.67% from the Jackpot. The Jackpot will hit 1 in every 1,873,848 spins per machine, or once every 104.1 days for the bank.

FIGS. 7A and 7*b* illustrate another example of a configuration menu 700. The operator can again use the configuration menu 700 having a multiple input fields 710 and output fields 730 that are calculated based on the values used in the input fields to set up the Prize Wheel bonus. The configuration menu 700 may also include optional input values 720 to provide further information to the operator. Here, the operator has configured a bank of machines with the following characteristics, as shown in FIG. 7A:

Jackpot: Porsche 911—value $125,000
Machines In Bank—20
Estimate Spins Per Day—1800
Side Bet—30 coins
Side Bet Return—95.0%

Here it is known that the Prize Wheel will come up for an individual player 1 in every 53.3 spins. The return from the Prize Wheel will be 71.53% from credit wedges and 23.47% from the Jackpot. The Jackpot will hit 1 in every 1,775,386 spins per machine, or once every 49.3 days for the bank.

Note that different ratios of return from credits and the Jackpot can be achieved by altering the weight of the Jackpot wedge on the wheel, as shown in FIG. 7B. The operator can configure the Jackpot weight and the software will auto-adjust the weight of a credit wedge accordingly. Keeping most of the numbers from FIG. 7A, but reducing the Jackpot weight by half and adjusting the 1500 wedge weight accordingly yields the following results: The Prize Wheel will come up for an individual player 1 in every 46.7 spins. The return from the Prize Wheel will be 81.61% from credit wedges and 13.39% from the Jackpot. The Jackpot will hit 1 in every 3,112,228 spins per machine, or once every 86.5 days for the bank.

Figure 9:
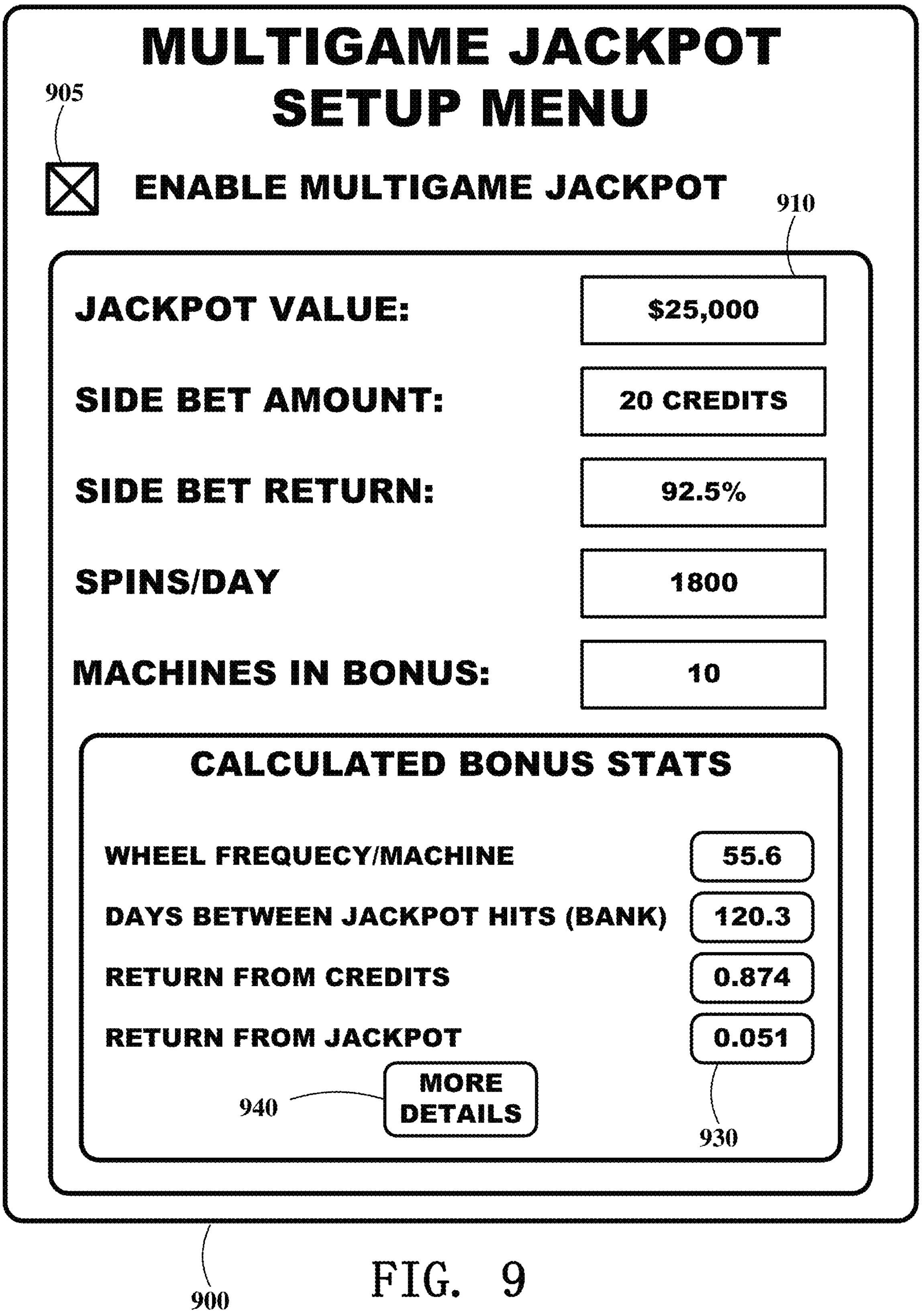
FIG. 9 is detail diagram of an example operator configuration menu for a multigame bonus according to embodiments of the invention.

FIGS. 8 and 9 illustrate other types of operator configuration menus that may be used in bonus modules according to embodiments of the invention. Referring to FIG. 8, the operator configuration menu 800 may include additional input fields, such as providing the operator the ability to alter the values of the bonus wheel, and/or the weights of each section of the bonus wheel.

Referring to FIG. 9, an operator configuration menu 900 may include an enablement field 905 to turn on or off a bonus module on a particular gaming device. The menu 900 may also include a plurality of input fields 910, that can be set by an operator, and include a plurality of output fields 930 that are calculated based on the values inserted in the input fields. The menu 900 may also include a button 940 to access more detailed reporting about a bonus based on the input fields 910 or past performance of the bonus.

Figure 10A:
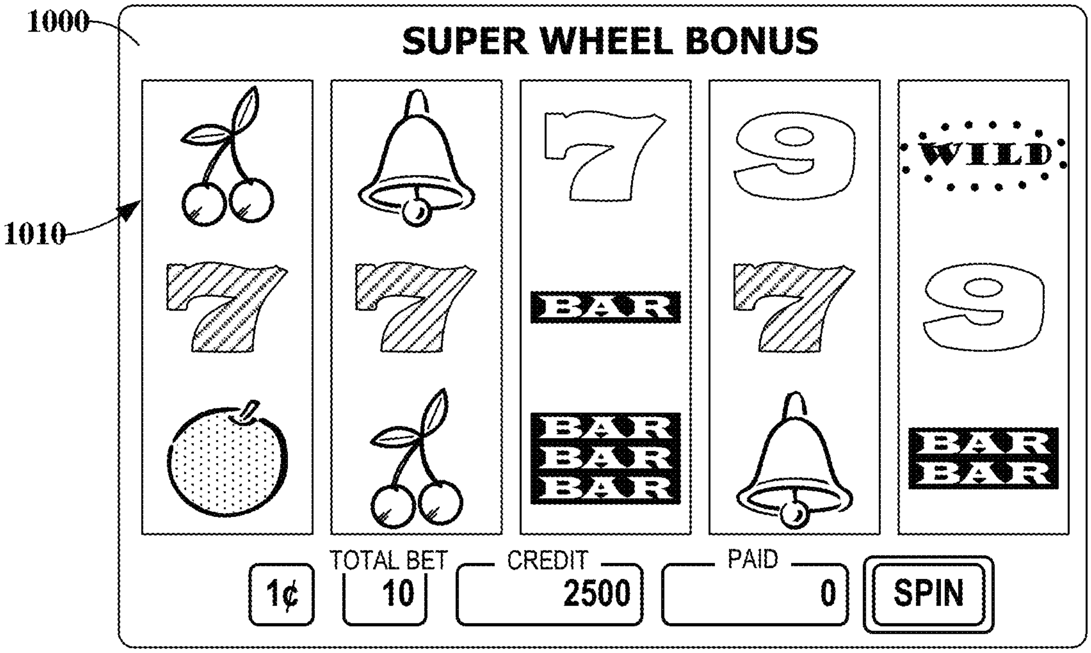
FIGS. 10A, 10B, 10C, and 10D are detail diagrams of a gaming display showing an example bonus progression according to embodiments of the invention.
Figure 10B:
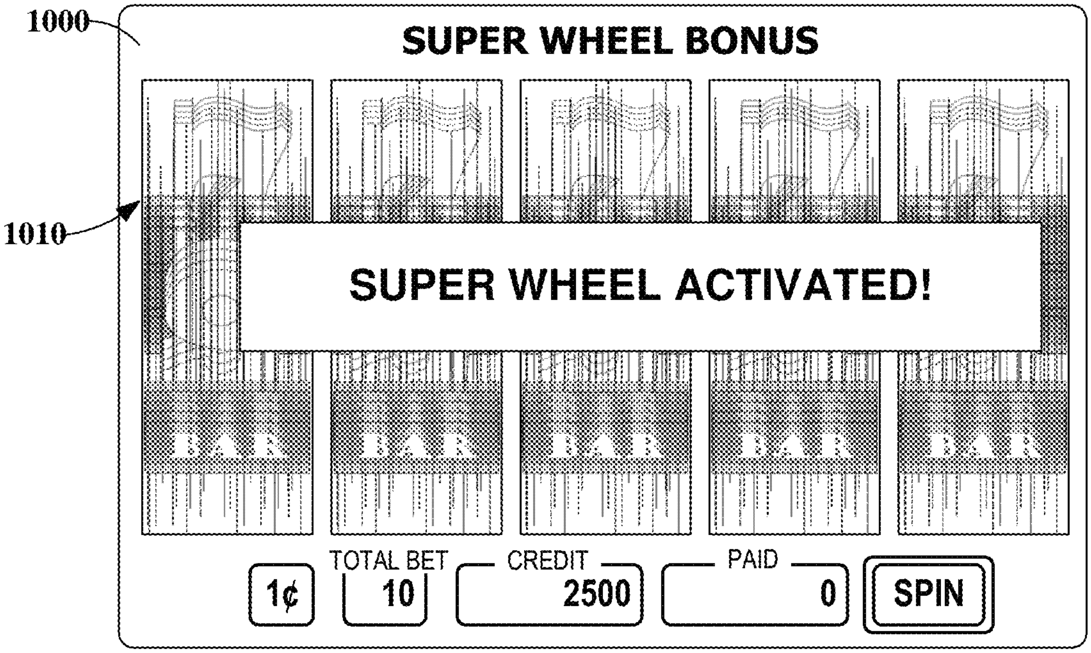
Figure 10C:
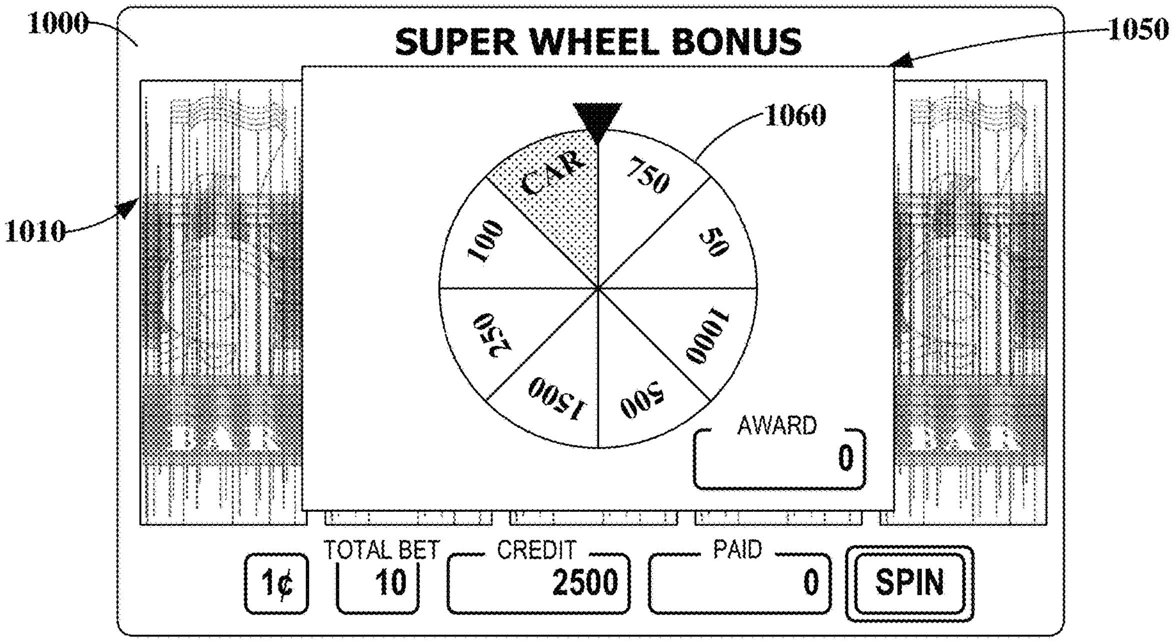
Figure 10D:
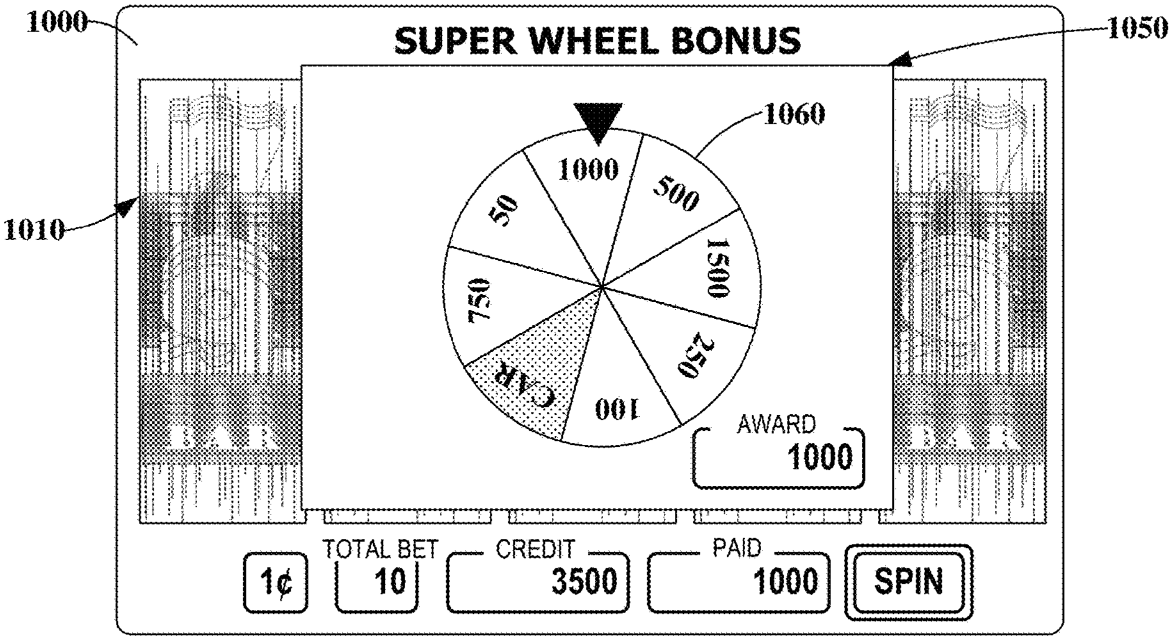

FIGS. 10A, 10B, 10C, and 10D are detail diagrams of a gaming display showing an example bonus progression according to embodiments of the invention. Referring to FIGS. 10A-10D, a gaming display 1000 includes a game play area 1010. As shown in FIG. 10B, a bonus may be randomly triggered during a base game. The bonus module may play out immediately while the game reels in the game play area 1010 are still spinning, or the bonus may wait to play out until after the result for the current gaming event has been displayed. As shown in FIG. 10C, a bonus window 1050 may appear and show the Prize Wheel 1060 bonus, or another type of bonus. Here, the Prize Wheel 1060 spins with a chance to win a car. As shown in FIG. 10D, the Prize Wheel 1060 has landed on a prize of 1000 credits.

Although the above-described multigame bonus configuration can be setup on a variety of gaming devices having different games, or game types, other embodiments of this concept can use flexibility in some of the other aspects of the bonus, such as the values of the bonus wheel sections to accommodate circumstances where the bonus side bet can vary between gaming devices participating in the jackpot bonus. That is, when creating a system which creates the perception of a linked bank of machines, such as is achieved with the above discussed Prize Wheel, it may be necessary to fix the return of certain prizes as a product of coin-in regardless of bet size or ratio between cost to cover and any activating side bets.

For example, given two machines side by side: Machine A with a cost to cover of 75 and a side bet of 25 to activate the Prize Wheel, and Machine B with a cost to cover of 40 and a side bet of 10, it may be desirable to guarantee that a player at Machine A has exactly the same chance to win a commonly selected prize per $1000 coin-in (or any amount of coin-in) as does a player at Machine B.

That is, if an operator were to set up a prize wheel bonus module on Machines A and B, both designating a car of value $50,000 as the Top Prize, then the chance of winning the car per $1000 coin-in should be the same between both machines. This may be true regardless of the discrepancy in cost to cover, side bet, and total bet. To accomplish this, a quantity Prize Coin Per 1000 may be designated. Alternatively, the Prize Coin Per Unit of Coin In may be designated. A determination of how many coins out of every 1000 coins in goes to funding the cost of the Top Prize may be completed where, the return on these coins is 100%. In other words, every coin of the Prize Coin Per 1000 is returned to the player in chances to win the Top Prize.

Since the Prize Coin Per 1000 returns 100%, a balance may be made to this by adjusting the weights of the remaining wedges on the Giveaway Wheel to ensure that the overall EV of the Giveaway Wheel matches given expectations. If the value of the wheel is held to a constant multiple of total bet, then by setting the value of the Top Prize and the Prize Coin Per 1000, a determination can be made as to how much the remaining Credit Wedges can return in order to yield the desired wheel RTP. This balancing of the Credit Wedge weights can be done in many fashions. One simple method is shown below in Table 1, where the weights of the Credit Wedges in normal font and the variable fields are highlighted in bold font. In order to adjust for the variable size, weight, and contribution of the Top Prize, the 6× and 400× wedges may be designated as the adjustment points. In this example, the total weight of the 6× and 400× wedges sums to 0.12, or 12%. The contributions of the 6× and 400× wedges must sum to X, where the value of the Giveaway Wheel minus the sum of the fixed green wedge contributions and the Top Prize wedge is X. The relative weight of the 6× and 400× wedges is adjusted to bring the EV of the wheel up or down.

TABLE 1

| Value (X) | Value (Credits) | Weight | Contribution |
|---|---|---|---|
| 1 | 75 | 0.00010000 | 0.008 |
| 2 | 150 | 0.00990000 | 1.485 |
| 3 | 225 | 0.09000000 | 20.250 |
| 4 | 300 | 0.10000000 | 30.000 |
| 5 | 375 | 0.10000000 | 37.500 |
| **6** | **450** | **0.11781681** | **53.018** |
| 8 | 600 | 0.10999063 | 65.994 |
| 10 | 750 | 0.11000000 | 82.500 |
| 12 | 900 | 0.10000000 | 90.000 |
| 15 | 1125 | 0.11000000 | 123.750 |
| 20 | 1500 | 0.07000000 | 105.000 |
| 25 | 1875 | 0.04000000 | 75.000 |
| 50 | 3750 | 0.03000000 | 112.500 |
| 100 | 7500 | 0.01000000 | 75.000 |
| **400** | **30000** | **0.00218319** | **65.496** |
| TOP PRIZE | 20000000 | 0.00000938 | 187.500 |

This is only one method for balancing the contribution of the Credit Wedges to compensate for changes in the contribution of the Prize Wheel. In other embodiments, other equations may be used similarly, that use more than two Credit Wedge weights, or that do not fix the EV of the Giveaway Wheel. For example, all of the contributions for the Credit Wedges can be modified to smooth the effect of adjusting the weights of the Credit Wedges.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above and in the appended claims.

The invention claimed is:

1. A gaming device comprising:

a video display device configured to display a game grid showing portions of a plurality of game reels in a matrix of symbol positions, and display a bonus prize indicator;

a memory device configured to store a credit amount and to store a bonus module, the bonus module including a bonus configuration menu having a plurality of input fields and a plurality of output fields, and including instructions for bonus mechanics associated with a bonus feature;

a wager input device structured to receive physical items associated with currency values; and a processor operable to:

receive a first signal including credentials indicating access from an operator of the gaming device;

display the bonus configuration menu in response to receiving the access signal;

receive a second signal indicating alteration of a value of a first input field from the plurality of input fields on the bonus configuration menu;

automatically calculate at least one new value for a first output field from the plurality of output fields in the bonus configuration menu based on the value of the altered first input field in the bonus configuration menu, the new value of the first output field altering a first bonus mechanic of the bonus feature associated with the bonus module; and receive a third signal to enable the bonus module during game play of the gaming device so that the bonus feature can be triggered during primary gaming events.

2. The gaming device of claim 1, wherein the processor is further operable to:

receive a fourth signal from the wager input device indicating receipt of a physical item associated with a currency value;

increase the credit amount stored in the memory based on the currency value of the received physical item;

receive a wager on a first primary gaming event, where an amount of the wager is deducted from the credit amount stored in the memory;

display a first game outcome for the first primary gaming event on the game grid; and initiate the bonus feature when the bonus feature is triggered during the first primary gaming event, the bonus feature including the altered first bonus mechanic.

3. The gaming device of claim 1, wherein the bonus feature includes a prize wheel having a plurality of credit prizes and a jackpot prize.

4. The gaming device of claim 3, wherein the credit prizes are fixed values on the prize wheel.

5. The gaming device of claim 3, wherein a least one value of the credit prizes is settable in the bonus configuration menu.

6. The gaming device of claim 1, wherein at least one of the input fields of the bonus configuration menu includes a field to set a value of a jackpot prize.

7. The gaming device of claim 1, wherein at least one of the input fields of the bonus configuration menu includes a field to set a value of a side bet required to participate in the bonus feature.

8. The gaming device of claim 7, wherein at least one of the input fields of the bonus configuration menu includes an average return on the side bet.

9. The gaming device of claim 1, wherein at least one of the input fields of the bonus configuration menu includes an average number of spins per day for a gaming device.

10. The gaming device of claim 1, wherein at least one of the input fields of the bonus configuration menu includes a number of gaming devices to participate in a multigame bonus.

* * * * *